Figure 1:
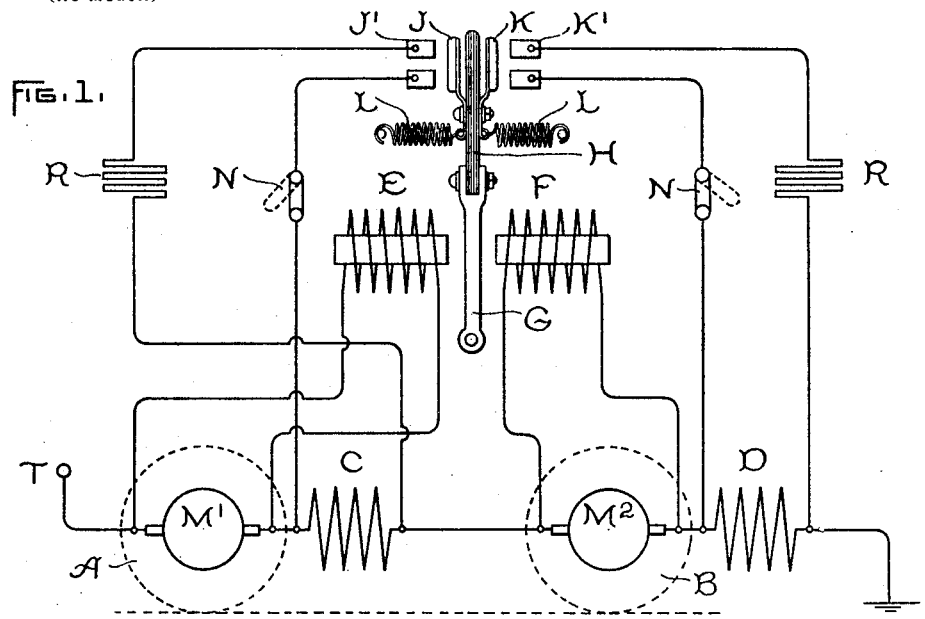

No. 636,023. Patented Oct. 31, 1899.
J. R. CRAVATH.
SYSTEM OF CONTROL FOR ELECTRIC MOTORS.
(Application filed May 4, 1898.)
(No Model.)

WITNESSES.
A. H. Abell
A. F. Macdonald.

INVENTOR.
James R. Cravath,
by Albert G. Davis
Atty.

THE NORRIS PETERS CO., PHOTO-LITHO., WASHINGTON, D. C.

UNITED STATES PATENT OFFICE.

JAMES R. CRAVATH, OF CHICAGO, ILLINOIS, ASSIGNOR TO THE GENERAL ELECTRIC COMPANY, OF NEW YORK.

SYSTEM OF CONTROL FOR ELECTRIC MOTORS.

SPECIFICATION forming part of Letters Patent No. 636,023, dated October 31, 1899.

Application filed May 4, 1898. Serial No. 679,665. (No model.)

*To all whom it may concern:*

Be it known that I, JAMES R. CRAVATH, a citizen of the United States, residing at Chicago, in the county of Cook, State of Illinois, have invented certain new and useful Improvements in Systems of Control for Electric Motors, (Case No. 785,) of which the following is a specification.

My invention relates to the control of electric motors which are employed to drive a common load—as, for example, an electric tram-car.

It is well known that when two or more motors are connected in series and geared or otherwise connected to a common load—as, for example, to separate pairs of wheels of a vehicle—and one pair of wheels begins to slip the counter electromotive force of the motor connected to the pair of slipping wheels increases and cuts down the impressed electromotive force which is supplied to the other motor or motors and causes a decrease in the tractive effort of the motors and also a decrease in speed.

My invention has for its object to overcome the objection above pointed out and to so arrange the motors that they will be able to start a heavy load without slipping the wheels. To accomplish this, I utilize the counter electromotive force developed by the racing machine to weaken its own field excitation, the changes of excitation due to this arrangement being entirely automatic.

Broadly speaking, my invention consists in weakening the torque or decreasing the counter electromotive force of any machine which tends to race. I do not make this weakening effect depend directly on the counter electromotive force of the motor in question, but rather on the proportion which this counter electromotive force bears to the counter electromotive force of the other motor of the set, if there are only two motors, or to the average counter electromotive force of the set if there are more than two. If the weakening effect were to depend upon the absolute counter electromotive force of the motor itself, a motor might slip badly, but would not be affected until its counter electromotive force rose to an amount greater than that corresponding to the highest speed for which it was designed.

My invention serves to keep the whole set of motors at substantially the same speed throughout the whole time of acceleration and running.

I have herein particularly described the regulation as affected by weakening the fields, but any method which serves to decrease the speed of the motor which has accelerated too rapidly is within my invention.

Figure 2:
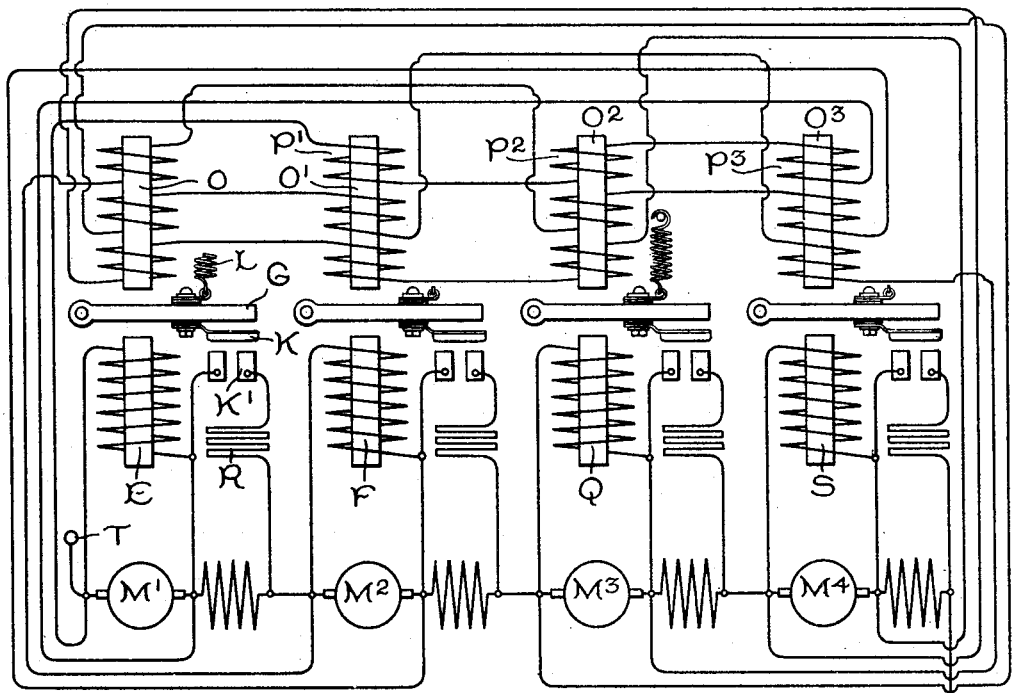

In the accompanying drawings, which show an embodiment of my invention, Figure 1 is a diagrammatic view of two motors connected to a common load, and Fig. 2 is a slight modification showing my invention applied to a tram-car or other apparatus having four motors.

In Fig. 1 the motors $M'$ and $M^2$ are of any desired construction and are geared or otherwise connected to wheels A and B of any suitable vehicle. For convenience of illustration the framework of the vehicle is omitted and the wheels are shown in dotted lines, the construction and arrangement of the various types of tram-cars and similar vehicles being so well understood as to require no further illustration. The motors M and $M'$ are respectively connected in series with field-coils C and D, and the two motors are shown as being connected in series between the trolley or source of supply T and the ground.

Around the armature of motor $M'$ is connected the coil of an electromagnet E, and the coil of a corresponding magnet F is connected around the armature of motor $M^2$. These coils are of comparatively high resistance, so as to limit the current flowing therein to a very small amount. Pivotally supported between the magnets and in a position to be acted upon thereby is a switch G, which carries at its outer end an insulating supporting-piece H. Situated on opposite sides of the insulating-piece are contacts J and K, the former being arranged to close the circuit of the fixed contacts $J'$ and the latter to close the circuit of the fixed contacts $K'$. The switch is normally held in a central position by a spring or springs L; but gravity may be employed for this purpose, if desired. In circuit with one of the contacts K' is a resistance R to limit the flow of current around the field-magnet coil D. In circuit with the other contact is a switch N, which is employed to interrupt the circuit of the shunting device at the time the motors are connected in parallel, as it is undesirable to weaken or change the strength of the field-magnets at that time. The arrangement of resistance and switches is similar with both motors.

The coils E and F are so proportioned that under normal running conditions they exert an equal attraction upon the armature of the switch G; but as soon as the counter electromotive force of one of the motor-armatures increases above that of its mate the armature of switch G is attracted by the coil in circuit with the motor-armature, and a shunt is thrown around the field of that motor which decreases its excitation, and the armature will slow down.

Assuming that motors M' and $M^2$ are propelling a vehicle and that the motor $M^2$ races, or, in other words, that the wheels to which its armature is connected slip, the counter electromotive force of the armature will increase, thereby causing more of the line-current to pass through coil F. This will cause the contact K to close the circuit of the fixed contacts K', and a certain proportion of the line-current will flow through the resistance R instead of the field of the motor, thereby decreasing the counter electromotive force and also the torque of the motor. As soon as this occurs the motor will slow down and the wheels will again grip the rails and propel the vehicle.

In Fig. 2 I have shown a slight modification of my invention applied to an electrically-propelled vehicle in which four motors are employed for driving purposes instead of two. The series-wound motors M', $M^2$, $M^3$, and $M^4$ are connected in series between the trolley T and the ground, and permanently connected around each motor-armature are coils E, F, Q, and S. Thus far the arrangement is similar to the one described in connection with Fig. 1; but as there are a number of motors which are connected in series it is advisable to have the force opposing the switch-operating magnet of each motor a resultant varying with the combined counter electromotive forces of the other motors. This opposing force is furnished for each motor by a number of energizing-coils, each of which is connected with one of the other motors. The arrangement of coils with respect to each motor being similar, a description of one of them will be sufficient. The switch-coil E is connected around the armature of motor M'. The core O is energized by three coils, which are respectively connected around the armatures of the motors $M^2$, $M^3$, and $M^4$. Between the upper and lower magnets is a pivoted switch G, carrying at its outer end a contact K, arranged to close the circuit of the fixed contacts K'. In circuit with one of the fixed contacts is a resistance R, arranged to limit the flow of current around the field-coil of the motor when the switch G is attracted by magnet E and closes the circuit of contacts K'. The switch is normally retained in the position shown by means of the spring L, which is so adjusted that it balances the weight of the switch-lever. Connected to the armature of the motor M' and in series with each other are coils P', $P^2$, and $P^3$, which are respectively mounted on cores O' $O^2$ $O^3$. Assuming that motor M' begins to race, due to the slipping of the vehicle-wheels, the counter electromotive force of the armature will run up, and as soon as the current in the coil of magnet E reaches a point where it overcomes the combined effect of the coils from the other three motors the switch G will close the circuit around its field-magnet and the counter electromotive force and torque of the motor will decrease until the wheels again grip the rails.

The principle of using one magnet excited from a coil the strength of which is dependent upon the counter electromotive force of one motor to oppose and balance a magnetic pull the strength of which is dependent on the average counter electromotive force of the remaining motors can be carried out in a variety of ways—as, for example, by connecting the coils of each motor individually in shunt across the motor instead of in series, as shown—and I aim to embrace all such modifications in the claims. This same method of regulation may be applied to shunt-wound motors by increasing the resistance of the field-circuit instead of decreasing it, as described in connection with series-wound motors.

Under most circumstances the motors employed to propel the vehicle would be mounted on the same or different trucks under the same car-body; but it is within the scope of my invention to mount the motors under different vehicles which are mechanically united to form a train, the location of the controlling devices and the shunting-switches being immaterial.

What I claim as new, and desire to secure by Letters Patent of the United States, is—

1. The method of preventing the racing of electric motors, which consists in decreasing the torque of any motor whose counter electromotive force rises above the average counter electromotive force of the motors of the set, and allowing said torque to remain at the value normally due to the current actually flowing, on any change of counter electromotive force of the motors as a set.

2. The method of equalizing the speed of a plurality of electric motors connected in series, which consists in decreasing the torque of any motor whose counter electromotive force rises substantially above its due proportion with reference to the other motors of the series, and allowing said torque to remain at the value normally due to the current actually flowing, on any change of counter electromotive force of the motors as a set.

3. The method of equalizing the speed of a plurality of electric motors connected in series, which consists in shunting the field of any motor whose counter electromotive force rises substantially above its due proportion with reference to the other motors of the series, and allowing said torque to remain at the value normally due to the current actually flowing, on any change of counter electromotive force of the motors as a set.

4. The combination with a plurality of motors connected in series and driving a common load through rolling connections, of means for equalizing the speed of the motors, such means consisting of a device for retarding any motor and a controlling-coil therefor responsive to excess of electromotive force at any pair of motor-terminals relative to the electromotive force at the other motor-terminals.

5. The combination with a plurality of motors connected in series and driving a common load through rolling connections, of means, operative in series position only, for equalizing the speed of the motors, such means consisting of a device for weakening the torque of any motor and a coil controlling the same responsive to increase of counter electromotive force in any motor relatively to the average counter electromotive force of the series.

6. In a system of control for preventing the racing of electric motors, the combination of a plurality of motors which are connected to a common load, a magnetically-actuated switch for decreasing the counter electromotive force of each motor when it tends to race, and a plurality of energizing-coils for each switch which are included in separate circuits.

7. In a system of control for preventing the racing of electric motors, the combination of a plurality of motors which are connected to a common load, a magnetically-actuated switch for shunting the field of each motor when its speed increases beyond that of the other motors connected to the same load, and differentially-acting coils on the switch so arranged that under normal conditions they balance each other and the switch is maintained in its open position.

8. In a system of control for preventing the racing of electric motors, the combination of a plurality of motors which are connected to a common load, a switch for decreasing the counter electromotive force of any one of the machines when it tends to race, but which will permit the speed of the motors as a unit to be increased or decreased, and means for maintaining the switch in an off position so long as the speed of the different motors corresponds.

9. In a system of control for electric motors, the combination of a plurality of motors mechanically united to drive a common load and connected in series between the source of supply and the return-circuit, switches, normally open, for shunting the fields of the motors by a resistance, a coil on each switch which is connected around the armature of the machine it governs, tending to actuate the switch in one direction, and a plurality of coils opposing the first-named coil, which are connected around the armatures of the other motors.

10. In a system of control for electric motors, the combination of a plurality of motors mechanically united to drive a common load and connected in series between the source of supply and the return-circuit, means for shunting the racing motor, the said means being actuated by a coil whose strength is dependent upon the counter electromotive force of the racing motor, and a magnetic pull the strength of which is dependent upon the combined counter electromotive force of the remaining motors opposing the said coil.

11. In a system of control for preventing the racing of electric motors which are connected in a manner to drive a common load, the combination of a plurality of switches, one being provided for each motor, an actuating-coil on each switch which is connected around the armature of the machine which it regulates, and a magnet for opposing the actuating-coil which is energized by a number of coils each connected around the armature of a separate machine.

12. The combination of a circuit, a plurality of electric motors, and a torque-reducing device for the several motors, responsive to an excess of counter electromotive force in any motor relatively to the others.

13. The means for maintaining uniformity of speed in a plurality of motors connected in series in the same circuit, comprising a speed-retarding device for each motor and an electric controlling device therefor responsive to an excess of armature speed of the controlled motor relatively to the others.

14. The combination of a plurality of electric motors connected to a common supply-circuit, and means for preventing variation of the several motor speeds, comprising a speed-retarding device and a controlling-coil therefor differentially responsive to the speed of the controlled motor and that of the others.

In witness whereof I have hereunto set my hand this 27th day of April, 1898.

JAMES R. CRAVATH.

Witnesses:
  W. A. DERBY,
  S. W. HUME.